(12) United States Patent
Lin et al.

(10) Patent No.: US 10,355,605 B1
(45) Date of Patent: Jul. 16, 2019

(54) ADJUSTABLE FREQUENCY CURVE FOR FLYBACK CONVERTER AT GREEN MODE

(71) Applicant: Wuxi Xu Da Electronic Technology Co., Ltd., Wuxi (CN)

(72) Inventors: Huang-Chi Lin, Nanjing (CN); Chi-Hao Wu, Nanjing (CN); Jun-Hsiung Huang, Nanjing (CN)

(73) Assignee: WUXI XU DA ELECTRONIC TECHNOLOGY CO, LTD., Wuxi (CN)

( * ) Notice: Subject to any disclaimer, the term of this patent is extended or adjusted under 35 U.S.C. 154(b) by 0 days.

(21) Appl. No.: 15/911,556

(22) Filed: Mar. 5, 2018

(30) Foreign Application Priority Data

Dec. 22, 2017 (CN) .......................... 2017 1 1406638

(51) Int. Cl.
*G05F 1/44* (2006.01)
*H02M 3/335* (2006.01)
*H02M 1/00* (2006.01)

(52) U.S. Cl.
CPC ..... *H02M 3/33523* (2013.01); *H02M 3/3353* (2013.01); *H02M 3/335* (2013.01); *H02M 2001/0032* (2013.01); *H02M 2001/0035* (2013.01)

(58) Field of Classification Search
CPC ......... H02M 3/335–33523; H02M 2001/0032; H02M 2001/0035
USPC ................................. 323/226, 282–289, 315
See application file for complete search history.

(56) References Cited

U.S. PATENT DOCUMENTS

| | | | | |
|---|---|---|---|---|
| 2008/0278225 | A1* | 11/2008 | Hu | H02M 3/33507 327/543 |
| 2010/0219802 | A1* | 9/2010 | Lin | H02M 3/33507 323/284 |
| 2014/0301116 | A1* | 10/2014 | Zhang | H02M 3/33515 363/21.15 |
| 2015/0244246 | A1* | 8/2015 | Krueger | H02M 1/00 363/21.17 |
| 2015/0244274 | A1* | 8/2015 | Fahlenkamp | H02M 3/33507 363/21.15 |
| 2017/0012538 | A1* | 1/2017 | Barrenscheen | H02M 3/33507 |
| 2017/0047846 | A1* | 2/2017 | Teo | H02M 3/33507 |

* cited by examiner

*Primary Examiner* — Fred E Finch, III
*Assistant Examiner* — Nusrat Quddus
(74) *Attorney, Agent, or Firm* — Muncy, Geissler, Olds & Lowe, P.C.

(57) ABSTRACT

A flyback converter with adjustable frequency curve includes a primary winding configured to receive an input voltage, a secondary winding coupled to the primary winding to generate an output DC voltage, a feedback circuit configured to receive the output DC signal and generate a feedback signal, a multi-mode control circuit, an auxiliary winding configured to provide power for operating the multi-mode control circuit, an exterior adjustable circuit connected between the auxiliary winding and the multi-mode controller for adjusting the input voltage level of the input feedthrough of the multi-mode control circuit, wherein the multi-mode control circuit configured to generate a switch control signal based on the information associated with the adjusted input signal through the input feedthrough of the multi-mode control circuit and the feedback signal, and a switching device configured to receive the switch control signal and change a current flowing through the primary winding.

17 Claims, 9 Drawing Sheets

ADJUSTABLE FREQUENCY CURVE FOR FLYBACK CONVERTER AT GREEN MODE

TECHNICAL FIELD

The present invention relates to a flyback converter, and more particularly, a flyback converter with an adjustable frequency curve at green mode.

BACKGROUND

Due to most electronic devices, for example printer, notebook computer, monitor, household electric appliances, and smart phone, their interior power are DC powered, therefore it is necessary to convert AC power into DC power for those electronic devices.

Enhancing power converting efficiency and power saving capability have became more important in the field of AC/DC application. Full load efficiency has always been a major consideration in designing an AC/DC power supply. However, as more and more power adapters still consume power in a standby mode, how to further improving the power saving capability at light loads and load shedding conditions has became increasingly important.

More and more AC/DC power converters support standby mode and don't need to turn off power as usual, in other words electric equipments can still consume electric power even without executing their main functions. For limiting standby time and enhancing power efficiency in the entire load ranges, various kinds of standards have been regulated and the most important one them is the energy star established by the environment protection agency (EPA) of the USA government. Energy star includes many developing standards, which can enhance the power saving capability in no load and light load conditions, increase the power efficiency in normal operation.

Flyback converter is one of the widely used power supply topologies due to low cost and less components it has.

Figure 1:
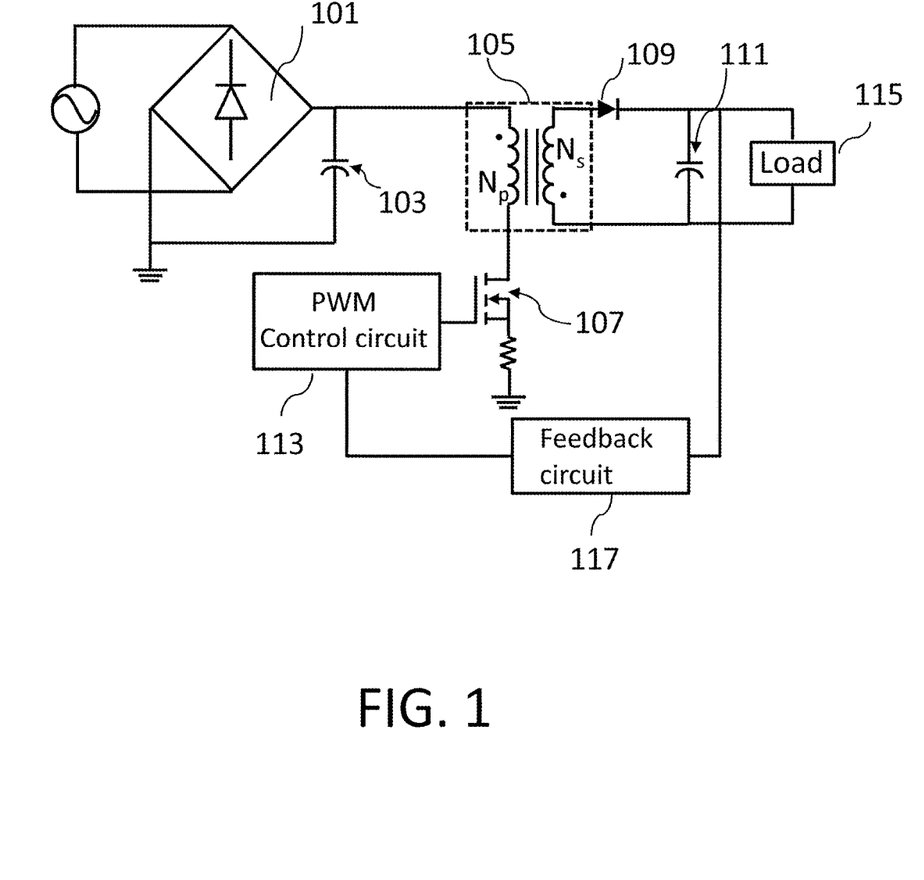
FIG. 1 illustrates a basic circuit diagram of a conventional flyback converter.

FIG. 1 indicates the circuit of the most common used flyback converter. A household AC power inputs an input voltage through a bridge rectifier 101 and a capacitor 103 for rectifying and filtering the AC voltage into a DC voltage, then feeds the DC voltage into the input of the transformer 105. Flyback converter has a power stage including a switching transistor 107, a diode 109, a transformer 105, and an output capacitor 111. By controlling the ON or OFF state of the switching transistor 107 via a pulse width modulation (PWM) control circuit 113, a DC voltage $V_{out}$ can be output through the coupled diode and capacitor on the secondary side circuit. The primary winding $N_p$ has functions for isolation, voltage conversion, and induction due to the fact that transformer 105 has an air gap. The primary winding $N_p$ receives the rectified DC voltage and stores it in the coils as the switching transistor 107 being switched ON, which transfers the magnetized energy (i.e. the DC voltage) stored in the coils into the secondary winding coils $N_s$ as the switching transistor 107 being turned off, then stores the magnetized energy in the capacitor 111 and generates a DC voltage. An output circuit is coupled to the secondary winding $N_s$ and a load 115 for generating the DC voltage to the load 115. A feedback circuit 117 receives the output voltage of the flyback converter and outputs the variation of voltage to the PWM control circuit 113 for controlling the switching transistor 107.

Flyback converters have been widely used for off-line power supply with power less than 100 Watts in electronic devices including printer, notebook computer, monitor, household electric equipments, smart phone and other 3C electronic products.

Normally, a flyback converter works in light load or no load condition, its output power is lower. If the flyback converter operates in a regular switching frequency, it has relatively higher portion of power loss causing the reduction of overall conversion efficiency. Generally, a switching power supply system's design parameters are decided while the specifications of a flyback converter are given. Because there are many specifications in the existing power supply systems, an optimizing power converting efficiency may not easy to reach by utilizing the same control IC to control the switching frequency curve of various flyback converters.

In order to solve the above mentioned issues, a flyback converter with an adjustable frequency curve at green mode is needed.

SUMMARY OF THE INVENTION

In this invention, a flyback converter with an adjustable frequency curve at green mode is proposed.

A flyback converter with adjustable frequency curve includes a primary winding configured to receive an input voltage; a secondary winding coupled to the primary winding to generate an output DC voltage; a feedback circuit configured to receive the output DC signal and generate a feedback signal; a multi-mode control circuit; an auxiliary winding configured to provide power for operating the multi-mode control circuit; an exterior adjustable circuit connected between the auxiliary winding and the multi-mode control circuit for adjusting the input voltage level of the input feedthrough of the multi-mode control circuit, wherein the multi-mode control circuit configured to generate a switch control signal based on the information associated with the adjusted input signal through the input of the multi-mode control circuit and the feedback signal; and a switching device configured to receive the switch control signal and to change a current flowing through the primary winding.

The exterior adjustable circuit further includes a curve selection detecting circuit in the interior of the multi-mode control circuit for detecting an input voltage from the exterior adjustable circuit and for selecting a frequency-reducing curve based on the detected voltage.

The curve selection detecting circuit includes a comparator circuit with an input connected to the exterior for detecting input voltage signals, an output for generating control signals, and a frequency-reducing curve selection circuit connected to the output of the comparator for selecting a frequency-reducing curve base on the control signals of the comparator.

The exterior adjustable circuit is a resistor connected between the auxiliary winding and the zero crossing voltage detection (QRD) pin of the multi-mode control circuit.

The multi-mode control circuit includes a voltage input for providing a power to operate the multi-mode control circuit; a switching device current sense input for generating current sense signal of the switching device; a feedback signal input for generating feedback voltage signal; a comparator circuit having an input connected to the exterior adjustable circuit for detecting input voltage; a frequency-reducing curve selection circuit connected to the output of the comparator circuit for selecting a frequency-reducing curve according to a control signal from the output of the comparator circuit; a quasi-resonant valley detection circuit connected to the exterior adjustable circuit for detecting the qusai-resonant valley or zero crossing voltage; a multi-mode control module configured to receive the feedback voltage, the zero crossing voltage, and the signal from the frequency-reducing curve selection circuit for generating a control signal; a PWM comparator configured to perform a logic operation and generate a corresponding signal by comparing the received current sense signal and the feedback signal; a SR flip-flop configured to receive the control signal from the multi-mode control circuit through its set terminal and the logic operation signal from the PWM comparator through its reset terminal for generating a control signal; and a gate driver configured to receive the control signal from the SR flip-flop to control the switching device.

The multi-mode control module contains a mode selection circuit having a plurality of comparators and logic selections. A continuous conduction mode (CCM), a quasi-resonant mode, a green mode, and a burst mode are respectively connected to the mode selection circuit. The control mode of the system can be determined by logic selections through comparing the received zero crossing voltage, the input signal from the frequency-reducing selection circuit and the feedback signal.

The voltage input further comprises a UVLO/OVP circuit for providing the multi-mode control circuit under-voltage lockout/over voltage protection function.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In general, a flyback converter, for example the conventional one as shown in FIG. 1, contains losses during operation, such as conduction loss, switching loss and the losses from the control circuit. Both conduction and switching losses are closely related to the switching frequency of the flyback converter. For a typical flyback converter in operation, its switching frequency can be fixed or increased as the load is decreased, however this can cause the reducing of the converter's overall efficiency.

Conventional continuous conduction mode (CCM) and discontinuous conduction mode (DCM) operations used in a flyback converter can result a significant conduction loss. For increasing the converter's efficiency and power saving capability, soft operation mode such as quasi-resonant (QR) mode has been applied in the flyback converter. In QR mode operation, the conduction voltage of the switching device in the primary side is reduced by enabling the energy stored in the capacitor during the previous OFF state been discharged and sent back to the power supply. This can largely enhance the power efficiency. For increasing the power saving efficiency in the entire load range, the flyback converter has to work at various operation modes depending on the load condition, for example at a frequency foldback mode (FFM) for gradually reducing the converter's switching frequency or at a power saving mode. As the load decreased gradually, the flyback converter operates at FFM mode can gradually reduce the converter's switching frequency. As the load is very small or in no load condition, the flyback converter with pulse skipping technique takes on a hysteresis mode, which can be called burst or power saving mode, for reducing switching loss and enhancing the power saving capability in the same time. In some applications, the flyback converter will apply a front-end power factor correction pre-regulator to disable the power factor correction function for further improving power saving.

Reducing switching frequency can lower power loss, especially in light load condition. However, for preventing magnetic elements of the flyback converter from saturating during operation, a pulse width from the pulse width modulation (PWM) generator needs to be controlled. To achieve the above-mentioned power saving requirement, there are more and more power converter utilize quasi-resonant and valley voltage switching techniques including pulse skipping technique for multi-mode operation. By applying these techniques, an AC/DC adapter can provide high efficiency and power saving capability in the entire load range. There are more and more power saving IC chips utilize the above-mentioned techniques to control power converters with different architectures. For pursuing high average conversion efficiency, taking on different operation modes of a flyback converter at various load conditions can be a practical approach. A flyback converter with multi-mode function can operate at: (1) continuous conduction mode in heavy load condition, quasi-resonant mode in medium load, at the QR mode, the frequency varies depending on the line voltage and the load conditions; (2) frequency foldback mode (FFM) in light load condition, in this mode dead time $t_{dead}$ can be prolonged for reducing the switching frequency and keep the on-time $t_{on}$ of the MOSFET switch unchanged; (3) green mode in ultra-light load, at such load levels, it's easier to maintain output voltage regulation. So there's switching only when the output voltage is moving out of regulation; (4) burst mode in no load conditions.

Figure 2A:
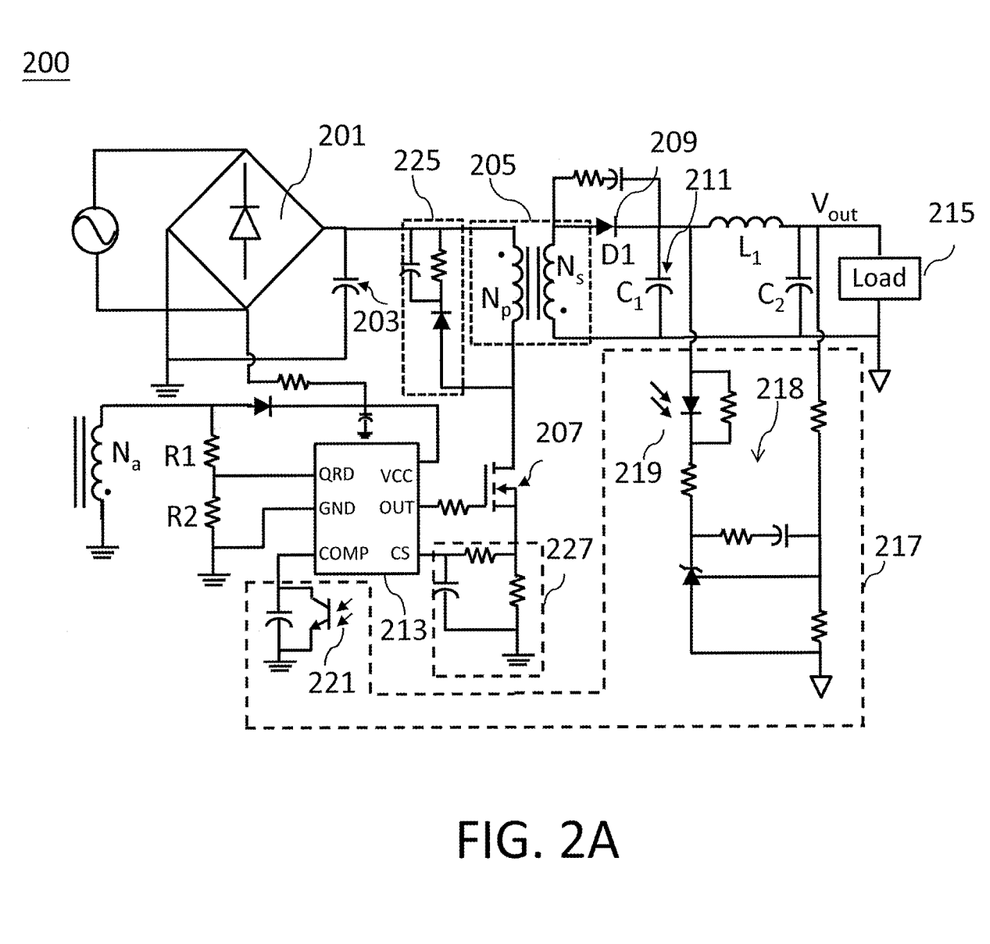
FIG. 2A illustrates a circuit diagram of a flyback converter with multi-mode mode control circuit according to present invention.

With reference to the circuit diagram of FIG. 2A, A flyback converter 200 with a multi-mode control circuit 213 is illustrated. A household AC power inputs an input voltage through a bridge rectifier 201 and a capacitor 203 for rectifying and filtering the AC voltage into a DC voltage. The DC voltage is then transferred into the input of the transformer 105. The flyback converter 200 has a power stage including a switching transistor 207, a diode 209, a transformer 205 and an output capacitor 211. By controlling the ON or OFF state of the switching transistor 207 via a multi-mode control circuit 213, a DC voltage can be output through the coupled rectifier circuit including a diode 209 and a capacitor 211 in the secondary side circuit. The multi-mode control circuit 213 controls the current flow through the primary winding $N_p$ of the transformer 205 to effectively switch the transformer 205 ON and OFF. The secondary winding $N_s$ supplies an output voltage ($V_{out}$) to the load 215 and the auxiliary winding $N_a$ provides a DC voltage source (Vcc) to operate the multi-mode control circuit 213 through a connected diode. Also illustrated in FIG. 2A includes an input capacitor that stores and filters the DC input voltage, an LC circuit ($L_1$, $C_1$, $C_2$) that stores and filters DC output voltage ($V_{out}$), diode circuits that prevent current flowing back into the secondary winding $N_s$ and a RCD snubber circuit connected across the primary winding $N_p$. The auxiliary winding $N_a$ connects the QRD pin via resister R1 and R2 for detecting zero crossing voltage (ZCV) and providing over voltage protection for QRD mode. A current detection circuit 227 connects to source of the MOSFET transistor and CS pin for detecting current flowing through the MOSFET transistor. A feedback circuit 217 generates a feedback signal (FB) that is proportional to the load 215 on the secondary winding $N_s$ of the transformer 205. The feedback signal (FB) is used by the multi-mode control circuit 213 to control switching frequency and the peak current of the transformer 205 as a function of the load 215. In addition, the feedback circuit 217 provides a voltage regulator that may be use to adjust the DC output voltage ($V_{out}$) to a desire level. More specifically, the feedback circuit 217 includes a shunt regulator 218 and an optocoupler 219, 221. The desired DC voltage level may be set by varying the resistor values in the shunt regular 218. The optocoupler includes a photodiode 219 and a phototransistor 221. In operation, the intensity of the light emitted by the diode is proportional to the load 215. As the intensity of the photodiode increases, so does the conduction of the phototransistor, which generates the feedback signal (FB). Therefore, feedback signal (FB) is proportional to the load 215, i.e., it increases as the load becomes heavier and decreases as the load becomes lighter. It should be understand, however, that in other examples the feedback circuit and the multi-mode control circuit 213 may be configured such that the feedback signal (FB) is inversely proportional to the load or otherwise varies in relation to the load.

Figure 2B:
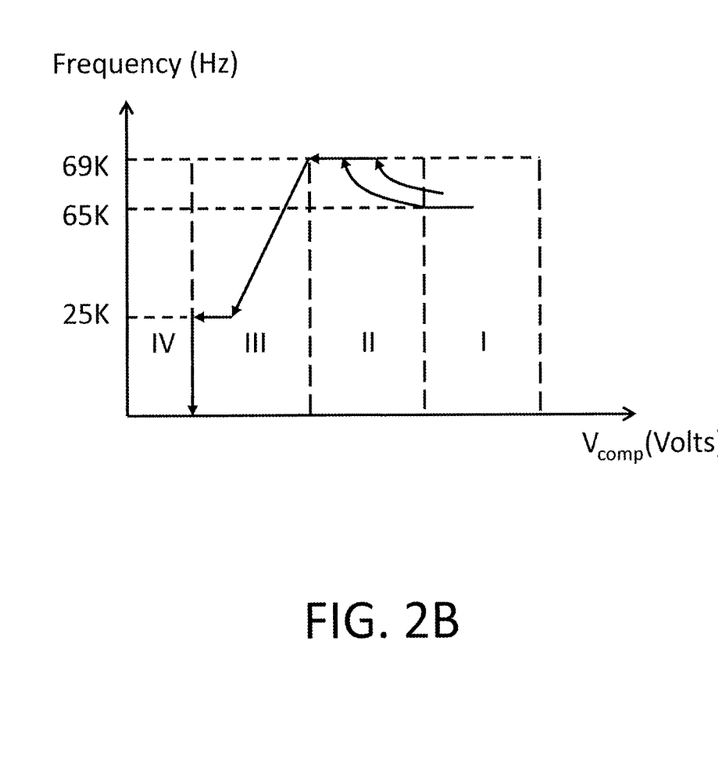
FIG. 2B illustrates a schematic view showing that the control circuit changes the mode of operation base on switching frequency and comp pin voltage according the present invention.

In the present invention, the multi-mode control circuit changes the mode of operation according to switching frequency and comp pin voltage (FB). As shown in FIG. 2B, at the normal operating condition, the control circuit operates in QR mode (II) to reduce the switching loss. In the QR mode, the frequency varies depending on the line voltage and the load condition. As the output load current is increased, the on-time $T_{ON}$ is increased, and thus the switching frequency decreases. If the switching frequency lows than 65 kHz, the control circuit adaptively transitions to a CCM mode. Thus, small size transformer can be used with high power conversion efficiency. As the output load current is decreased, the on-time $T_{ON}$ is decreased, and thus the switching frequency increases. If the switching frequency increases till over the clamp of 69 kHz, control IC will skip the first valley to turn on in 2nd or 3rd valley. At light load condition, the $V_{COMP}$ is lower than $V_{SG1}$ and the system operates in green mode for high power conversion efficiency. The max switching frequency clamp will start to linearly decrease from 69 kHz to 23 kHz. The valley switching characteristic is still preserved in green mode, i.e. region III. That is when load decreases, the system automatically skip more and more valleys and the switching frequency is reduced. At zero load or very light load conditions ($V_{COMP}$<Burst mode voltage), i.e. region IV, the gate output pin of the control IC will be disabled immediately for enhancing power saving.

Figure 3A:
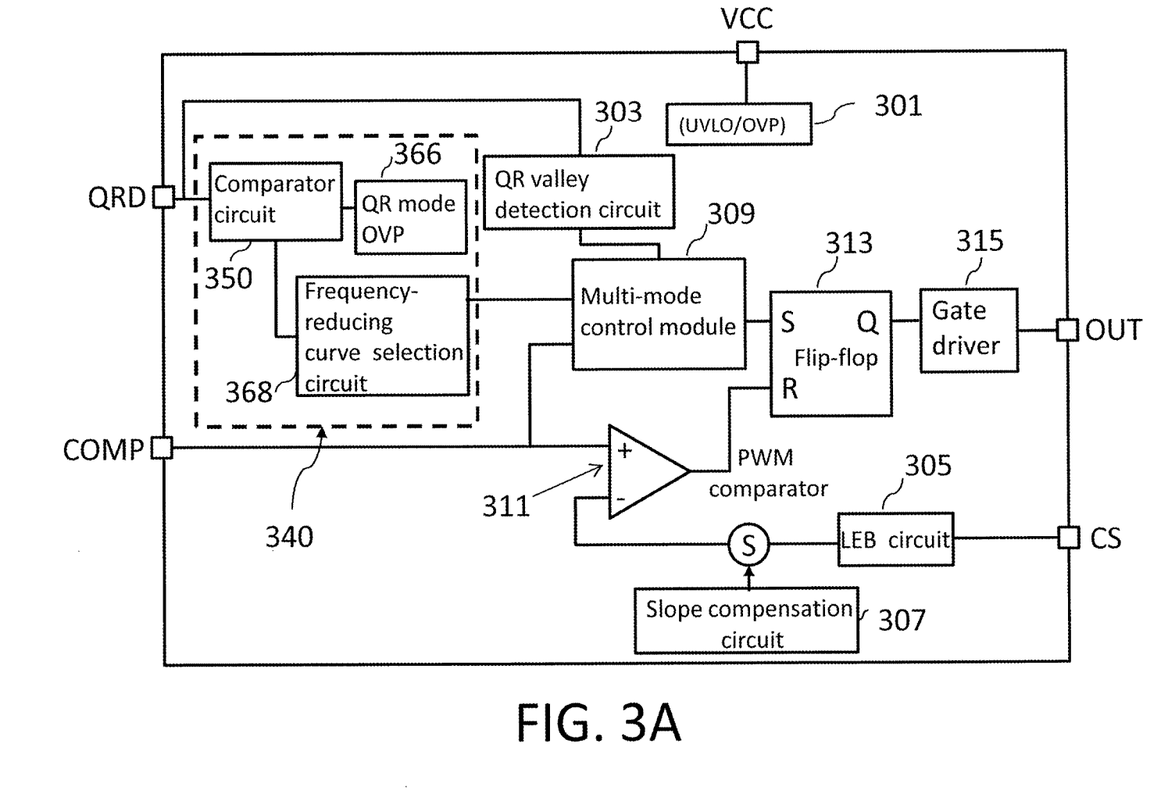
FIG. 3A illustrates an interior functional block diagram of the multi-mode control circuit with frequency-reducing curve selection function according to the present invention.

FIG. 3A illustrates an interior functional block diagram of the multi-mode control circuit with frequency-reducing curve selection function according to the present invention. An under-voltage lockout/over-voltage protection (UVLO/OVP) circuit 301 is connected to a VCC pin, which includes a hysteresis UVLO comparator (not shown) with a turn-on and turn-off thresholds being fixed at 16V and 7.5V respectively and another OVP comparator (not shown) with an over-voltage protection threshold 28V. A quasi-resonant valley detection circuit 303 connected to the QRD pin will detect auxiliary winding voltage to turn on the MOSFET. A curve selection detecting circuit 340 contains a comparator circuit 350 with a plurality of comparators, which is connected to QRD pin for either performing over-voltage protection 366 under QRD mode or selecting a frequency-reducing curve through a frequency-reducing curve selection circuit 368 depending on the detected voltage from the QRD pin. A leading-edge blanking (LEB) circuit 305 connects to the CS pin of the multi-mode control circuit for preventing the MOSFET from fault trigger caused by a turn-on spike, which contains a built-in leaking-edge blanking time. A built-in slope compensation circuit 307 is constructed in the multi-mode control circuit. When the switch is on, a ramp voltage is added to the sensed voltage across the CS pin, which helps to stabilize the system and prevent sun-harmonic oscillations. A pulse width modulation signal generator includes a valley detection circuit 303, a multi-mode control module 309, a PWM comparator 311, a SR flip flop 313 and a gate driver 315.

A PWM comparator 311 receives a sensed voltage across the CS pin ($V_{sense}$ signal) from a inverting (−) terminal and a feedback signal $V_{COMP}$ (FB) from a non-inverting terminal (+) terminal. The PWM comparator 311 can perform a logical operation and send a corresponding signal to the reset terminal R of the SR flip-flop 313 based on the received signal, the multi-mode control module 309 receives output signals from the QR valley detection circuit 303 and the curve selection detecting circuit 340, and a feedback signal ($V_{COMP}$) from COMP pin to select an operation mode and control the output signal of an oscillator (not shown). The SR flip-flop 313 will perform logic operations and send corresponding signals through the inverting output terminal Q to control the gate driver 315 according to the input signals.

Figure 3B:
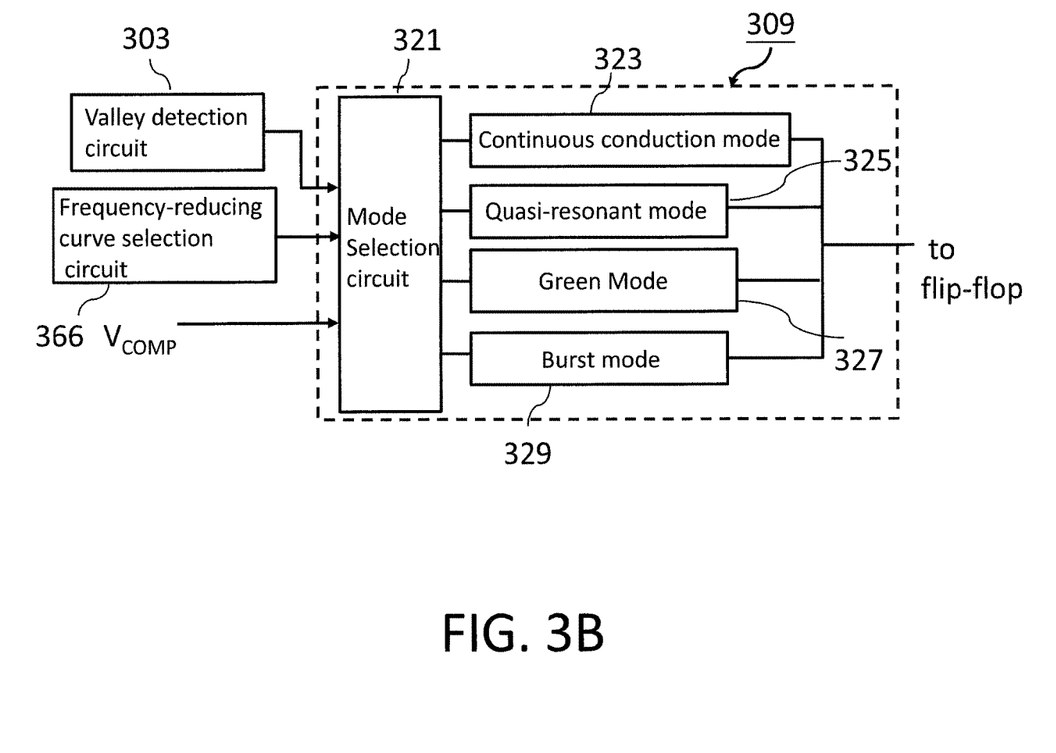
FIG. 3B illustrates a functional block diagram of a multi-mode control module according to the present invention.

FIG. 3B illustrates a functional block diagram of a multi-mode control module 309, which includes a mode selection circuit 321, a continuous conduction mode (CCM) module 323, a QR module 325, a green module 327, and a burst module 329. The mode selection circuit 321 connects to the CCM module 323, the QR module 325, the green module 327, and the burst module 329 individually, which also having exterior inputs connect to a valley detection circuit 303, a frequency-reducing curve selection circuit 366, and a COMP pin. The mode selection circuit 321 contains a plurality of voltage comparators (not shown) for making logic choices. When the output voltage of the valley detection circuit 303 is lower than a threshold $V_{ref}$, a first comparator output a signal to active the QR mode 325, the green mode 327 and the burst mode 329; if the output of the valley detection circuit 303 is higher than a threshold $V_{ref}$, the first comparator will active CCM mode 323 only. Another set of comparator includes a second and a third comparator for providing comparison between two voltage thresholds $V_{th\_H}$ and $V_{th\_L}$, when the $V_{COMP}$ is larger than the threshold $V_{th\_H}$ only output control signals for activating CCM mode 323 and QR mode 325; when $V_{COMP}$ is between a higher threshold $V_{th\_H}$ and a lower threshold $V_{th\_L}$ only active the burst mode 327. Therefore, input signals from those exterior connections can be selected by modes logic selection criteria mentioned above and be converted into control signals to drive a gate driver through a flip-flop.

Generally, a switching power supply system's design parameters are decided while the specifications of a flyback converter are given. Because there are many specifications in the existing power supply systems, therefore an optimized power converting efficiency may not easy to reach by utilizing the same control IC to control the switching frequency curve of different flyback converters. In order to solve the above mentioned issues, a flyback converter with an exterior voltage adjusting circuit connects to a multi-mode control IC with an adjustable frequency curve selection at green mode is provided.

Figure 4A:
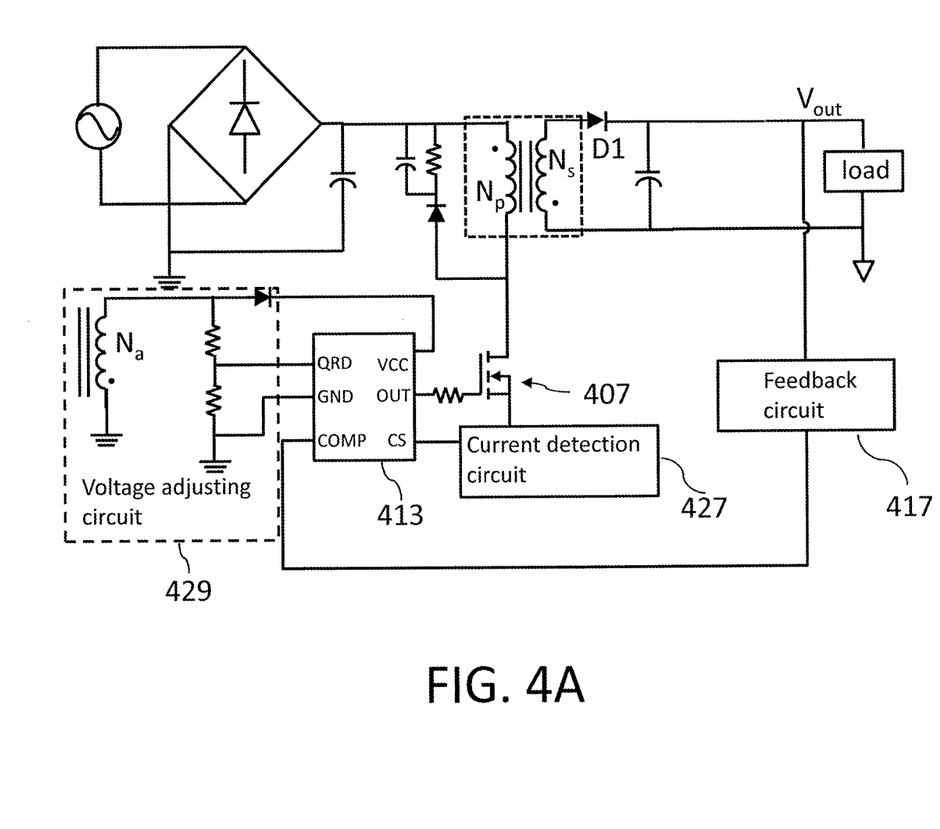
FIG. 4A-B illustrates a circuit diagram of a flyback converter with adjustable frequency curve selection technique according to an embodiment of the invention.
Figure 4B:
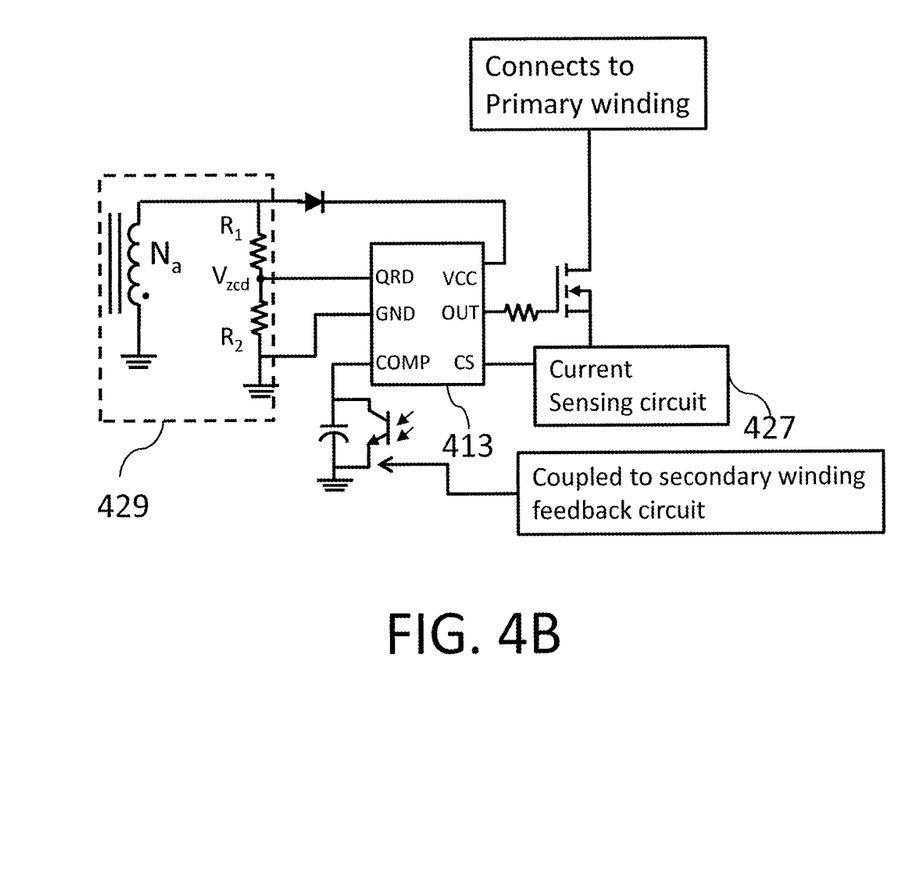
Figure 4C:
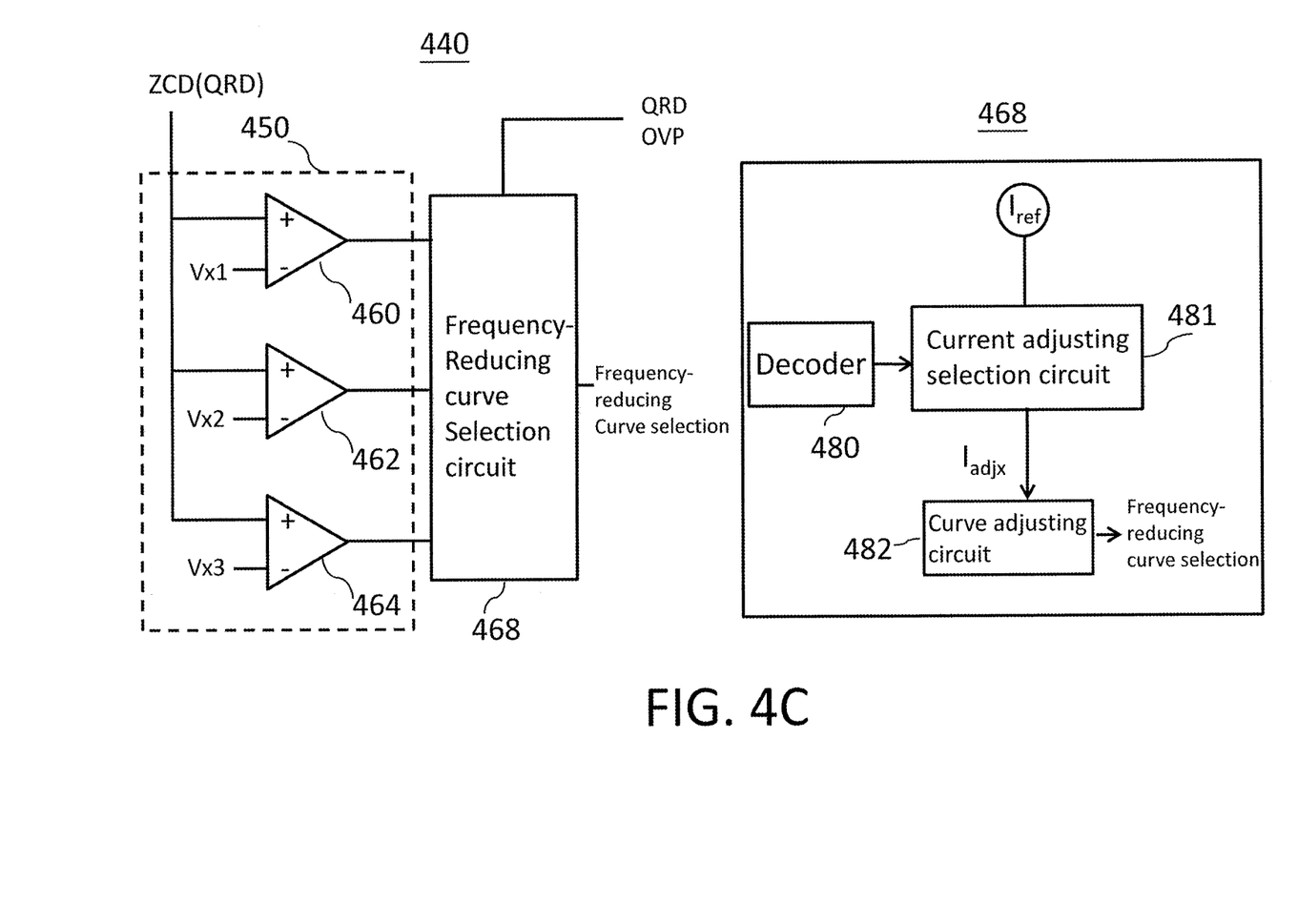
FIG. 4C illustrates a schematic view of the multi-mode control circuit with frequency-reducing curve selection function showing an interior block function diagram of the frequency-reducing curve selection circuit, the connection between ZCD(QRD) pin and the frequency-reducing curve selection circuit, the according to the present invention.

As illustrated in FIG. 4A-C, in one embodiment of the present invention, a detected voltage $V_{ZCD}$, through an exterior voltage adjusting circuit 429 connected to the QRD pin of the multi-mode control circuit 413, is adjustable. When the switching device 407 is turned off, the detected voltage $V_{ZCD}$ is delivered to a comparator circuit 450 in the interior of the multi-mode control circuit 413, the comparator circuit 450 connects to the QRD pin, a choice can be made by the comparator circuit 450 to output a control signal into the QR mode OVP circuit or into a frequency-reducing curve selection circuit 468 for frequency-reducing curve selection based on the values of $V_{ZCD}$. The multi-mode control circuit 413 can choose a frequency-reducing curve through the voltage adjusting circuit 429, the comparator circuit 450, and further combined with the frequency-reducing curve selection circuit 468 to enhance the conversion efficiency of the flyback converter. Therefore, there are more options for applying same control IC in different power supply systems, particularly the amounts of component stocking for producing a power supply can be reduced and the power supply also can be cost down. FIG. 4B illustrates a the voltage adjusting circuit 429 in connection with a flyback converter according to an embodiment of the invention, only the related portions of the flyback circuit is shown, the power stage and detection circuit in the secondary winding side are skipped. The voltage adjusting circuit 429 is composed of a resister R1 connected in serious between the QRD pin and the auxiliary winding $N_a$, and another resister R2 connected QRD pin and GND, which can make the $V_{ZCD}$ adjustable. In the left of FIG. 4C, a circuit diagram view of a comparator circuit 450 connects to the QRD pin and a frequency-reducing curve selection circuit 468. The comparator circuit 450 includes three comparators, i.e. a first comparator 460, a second comparator 462 and a third comparator 464. When the detected voltage $V_{ZCD}$>Vx1 the over-voltage protection will be activated; when the detected voltage is in one of the following conditions, such as Vx2<$V_{ZCD}$<Vx1, Vx3<$V_{ZCD}$<Vx2 or $V_{ZCD}$<Vx3, the frequency-reducing selection circuit 468 will be in a frequency-reducing curve selection mode, the frequency curve of the multi-mode control circuit is adjustable from an exterior circuit. Therefore, a better conversion efficiency can be achieved by a flyback converter with an adjustable frequency curve selection at green mode. In the right of FIG. 4C, an interior block function diagram of the frequency-reducing curve selection circuit 468 is illustrated, which contains a decoder 480, a reference current source Iref, a current adjusting selection circuit 481, and a curve adjusting circuit 482 according to one embodiment of the present invention. The reference current Iref flows into the current adjusting selection circuit 481 and decides an adjustment current Iadjx base on the signal received by the decoder 480 from the comparator circuit 450, then the adjustment current Iadjx instructs the curve adjusting circuit 482 to select a frequency-reducing curve.

Figure 5:
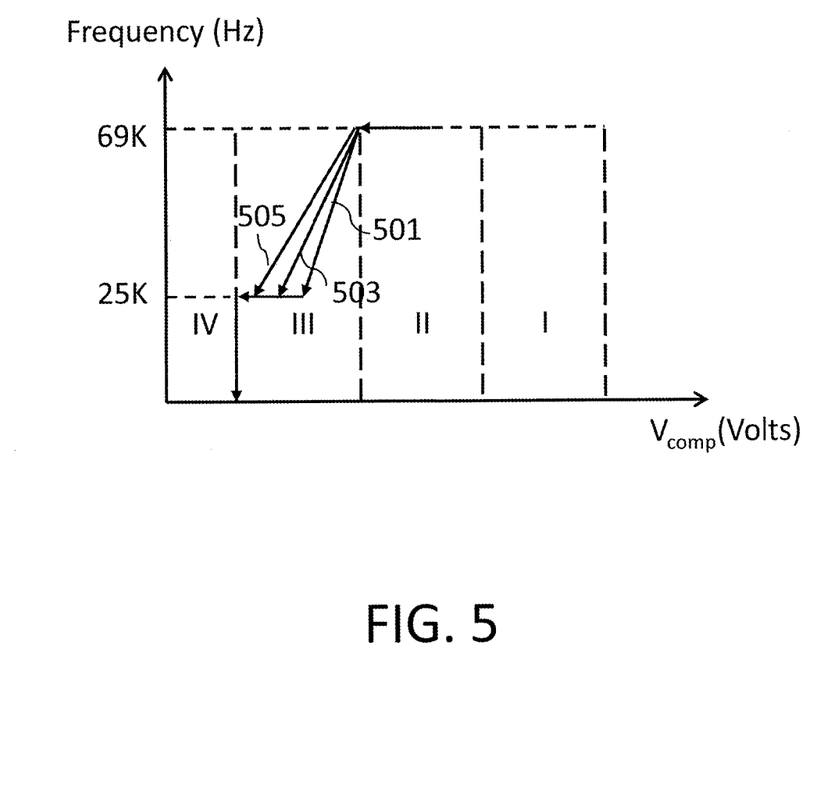
FIG. 5 illustrates a schematic view showing frequency-reducing curves corresponding to the flyback converter with adjustable frequency curve selection technique showing in FIG. 4 according to the present invention.

FIG. 5 illustrates a schematic view showing frequency-reducing curves corresponding to the flyback converter with adjustable frequency curve selection technique showing in FIG. 4. Each of them, i.e. curve 501, 503, or 505, represents a corresponding frequency-reducing curve by varying resistors R1 and R2 accordingly. The marks indicated with I, II, III, IV represent the CCM, the QR, the green, and burst mode respectively.

The present invention has the features and advantages:

(1) the flyback converter provides a multi-mode control IC with an adjustable frequency curve selection, a frequency-reducing curve can be adjusted by an exterior circuit connected to the multi-mode control IC;

(2) there are more options for applying same control IC in different power supply systems;

(3) the amounts of component stocking for producing a power supply can be reduced and the power supply also can be cost down.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A flyback converter with adjustable frequency curve comprising:
   a primary winding configured to receive an input voltage;
   a secondary winding coupled to the primary winding and connected to a rectifier circuit to generate an output DC voltage;
   a feedback circuit coupled to output of the rectifier circuit of the secondary winding to generate a feedback signal;
   a multi-mode control circuit including:
      a voltage input for providing a power to operate the multi-mode control circuit;
      a switching device current sense input for providing a current sense signal of the switching device and generating a control signal;
      a feedback signal input for providing a feedback signal;
      a comparator circuit having an input connected to the exterior adjustable circuit for detecting an input voltage and generating a control voltage;

a quasi-resonant valley detection circuit having an input connected to the exterior adjustable circuit for performing quasi-resonant valley detection or zero crossing detection;

a multi-mode control module configured to receive the feedback signal, the quasi-resonant valley detection signal, and the signal from the frequency-reducing curve selection circuit for generating a control signal;

a pulse width modulation comparator configured to perform a logic operation and generate a corresponding signal by comparing the received current sense signal and feedback signal;

a SR flip-flop configured to receive the control signal from the multi-mode control module through its set terminal and the logic operation signal through its reset terminal for generating a control signal through its output; and a gate driver configured to receive the control signal from the SR flip-flop for controlling the switching device;

an auxiliary winding is configured to provide power for operating the multi-mode control circuit;

an exterior adjustable circuit connected between the auxiliary winding and the multi-mode control circuit for adjusting the input voltage level of the input feedthrough of the multi-mode control circuit, wherein the multi-mode control circuit is configured to generate a switch control signal based on the information associated with the adjusted input signal through the input feedthrough of the multi-mode control circuit and the feedback signal; and a switching device connected to the primary winding and the multi-mode control circuit to receive the switch control signal and change a current flowing through the primary winding.

2. The flyback converter with adjustable frequency curve of claim 1, wherein the exterior adjustable circuit further includes a curve selection detecting circuit in the interior of the multi-mode control circuit been connected to for detecting the input signal from the exterior adjustable circuit and providing frequency-reducing curve selection.

3. The flyback converter with adjustable frequency curve of claim 2, wherein the curve selection detecting circuit includes:

a comparator circuit having its input connected to an exterior adjustable circuit for detecting an input voltage and generating a control signal; and a frequency-reducing selection circuit connected to the output of the comparator circuit for performing a frequency-reducing curve selection based on the control signal generated from the comparator circuit.

4. The flyback converter with adjustable frequency curve of claim 1, wherein the exterior adjustable circuit is a resistor connected in series to a zero crossing detection (ZCD) pin of the multi-mode control circuit.

5. The flyback converter with adjustable frequency curve of claim 1, wherein the multi-mode control module includes:

a mode selection circuit comprising a plurality of voltage comparators and logic selections;

a continuous conduction mode;

a quasi-resonant mode;

a green mode; and a burst mode, wherein the continuous conduction module, the quasi-resonant module, the green module, and the burst are configured to connect to the mode selection circuit individually for determining a operation mode of the flyback converter through the logical selections based on the quasi-resonant valley detection signal, the signal from the frequency-reducing curve selection circuit and the feedback signal.

6. The flyback converter with adjustable frequency curve of claim 1, wherein the voltage input further includes a under-voltage lockout/over-voltage protection (UVLO/OVP) circuit for protecting the multi-mode control circuit.

7. The flyback converter with adjustable frequency curve of claim 1, wherein the switching device is a MOSFET.

8. The flyback converter with adjustable frequency curve of claim 1, wherein the primary winding and the secondary winding are coupled through a transformer.

9. The flyback converter with adjustable frequency curve of claim 1, wherein the feedback circuit includes a shunt regular and a photocoupler, the photocoupler is composed of a light emitting diode and a phototransistor.

10. A flyback converter with adjustable frequency curve comprising:

a primary winding configured to receive an input voltage;

a secondary winding coupled to the primary winding and connected to a rectifier circuit to generate an output DC voltage;

a feedback circuit coupled to output of the rectifier circuit of the secondary winding to generate a feedback signal;

a multi-mode control circuit with a curve selection detecting circuit in its interior; wherein the curve selection detecting circuit includes:

a comparator circuit having its input connected to an exterior adjustable circuit for detecting an input voltage and generating a control signal; and a frequency-reducing selection circuit connected to the output of the comparator circuit for performing a frequency-reducing curve selection based on the control signal outputting from the comparator circuit, wherein the frequency-reducing selection circuit includes:

a decoder;

a reference current source;

a current adjusting selection circuit; and a curve adjusting circuit, wherein the reference current source flows into the current adjusting selection circuit and decide an adjustment current through receiving output signals from the comparator circuit by the decoder, the adjustment current instructs the current adjusting selection circuit to make a frequency-reducing curve selection;

an auxiliary winding is configured to provide power for operating the multi-mode control circuit;

an exterior adjustable circuit connected between the auxiliary winding and the curve selection detecting circuit of the multi-mode control circuit for adjusting an input voltage level of an input feedthrough of the multi-mode control circuit, wherein the multi-mode control circuit is configured to generate a switch control signal based on the information associated with the adjusted input signal through the input feedthrough of the multi-mode control circuit and the feedback signal; and a switching device connected to the primary winding and the multi-mode control circuit to receive the switch control signal and change a current flowing through the primary winding.

11. The flyback converter with adjustable frequency curve of claim 10, wherein the exterior adjustable circuit is a resistor connected in series to a zero crossing detection (ZCD) pin of the multi-mode control circuit.

12. A flyback converter with adjustable frequency curve of claim 10, wherein the multi-mode control circuit further includes:
- a voltage input for providing a power to operate the multi-mode control circuit;
- a switching device current sense input for providing a current sense signal of the switching device and generating a control signal;
- a feedback signal input for providing a feedback signal;
- a quasi-resonant valley detection circuit having an input connected to the exterior adjustable circuit for performing quasi-resonant valley detection or zero crossing detection;
- a multi-mode control module configured to receive the feedback signal, the quasi-resonant valley detection signal, and the signal from the curve selection detecting circuit for generating a control signal;
- a pulse width modulation comparator configured to perform a logic operation and generate a corresponding signal by comparing the received current sense signal and feedback signal;
- a SR flip-flop configured to receive the control signal from the multi-mode control module through its set terminal and the logic operation signal from the pulse width modulation comparator through its reset terminal for generating a control signal through its output; and
- a gate driver configured to receive the control signal from the SR flip-flop for controlling the switching device.

13. The flyback converter with adjustable frequency curve of claim 12, wherein multi-mode control module includes:
- a mode selection circuit comprising a plurality of voltage comparators and logic selections;
- a continuous conduction mode;
- a quasi-resonant mode;
- a green mode; and
- a burst mode, wherein the continuous conduction module, the quasi-resonant module, the green module, and the burst are configured to connect to the mode selection circuit individually for determining a operation mode of the flyback converter through the logical selections based on the quasi-resonant valley detection signal, the signal from the frequency-reducing curve selection circuit and the feedback signal.

14. The flyback converter with adjustable frequency curve of claim 12, wherein the voltage input further includes a under-voltage lockout/over-voltage protection (UVLO/OVP) circuit for protecting the multi-mode control circuit.

15. The flyback converter with adjustable frequency curve of claim 10, wherein the switching device is a MOSFET.

16. The flyback converter with adjustable frequency curve of claim 10, wherein the primary winding and the secondary winding are coupled through a transformer.

17. The flyback converter with adjustable frequency curve of claim 10, wherein the feedback circuit includes a shunt regular and a photocoupler, the photocoupler is composed of a light emitting diode and a phototransistor.

\* \* \* \* \*